US012123998B1

(12) United States Patent
Yang et al.

(10) Patent No.: US 12,123,998 B1
(45) Date of Patent: Oct. 22, 2024

(54) SYSTEM AND METHOD FOR CONTROLLED-SOURCE ELECTROMAGNETIC EXPLORATION BASED ON STAGGERED FREQUENCY EXCITATION OF CROSSED SOURCES

(71) Applicant: SHANDONG UNIVERSITY, Shandong (CN)

(72) Inventors: Yang Yang, Jinan (CN); Shucai Li, Jinan (CN); Heng Zhang, Jinan (CN); Yuzhen Zhu, Jinan (CN); Huaifeng Sun, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/411,805

(22) Filed: Jan. 12, 2024

(30) Foreign Application Priority Data

Apr. 12, 2023 (CN) .......................... 202310382894.4

(51) Int. Cl.
*G01V 3/08* (2006.01)
(52) U.S. Cl.
CPC ........ *G01V 3/083* (2013.01); *G01V 2003/084* (2013.01); *G01V 2003/085* (2013.01)
(58) Field of Classification Search
CPC ............. G01V 3/083; G01V 2003/084; G01V 2003/085
USPC ............................................................ 702/2
See application file for complete search history.

(56) References Cited

U.S. PATENT DOCUMENTS

| 2009/0120636 | A1 | 5/2009 | Summerfield et al. |
| 2022/0308249 | A1 | 9/2022 | Li et al. |
| 2022/0308838 | A1* | 9/2022 | He ........................... G06F 7/68 |

FOREIGN PATENT DOCUMENTS

| CN | 104597506 A | 5/2015 |
| CN | 104977619 A | 10/2015 |
| CN | 110187394 A | 8/2019 |
| CN | 111505722 A | 8/2020 |
| CN | 111505723 A | 8/2020 |
| CN | 114019568 A | 2/2022 |
| CN | 114910968 A | 8/2022 |
| CN | 115086122 A | 9/2022 |

(Continued)

OTHER PUBLICATIONS

May 19, 2023 Office Action issued in Chinese Patent Application No. 202310382894.4.

(Continued)

*Primary Examiner* — Aditya S Bhat
(74) *Attorney, Agent, or Firm* — Oliff PLC

(57) ABSTRACT

A system and method for controlled-source electromagnetic exploration is based on staggered frequency excitation of crossed sources. Different high-order pseudo-random signals are transmitted using two sources, respectively, each set of high-order pseudo-random signals may contain sufficient frequencies within a same complete frequency range, exploration frequencies of the two sets of signals are completely staggered, simultaneous transmission by the two field sources is implemented, and different polarization modes do not affect each other and are separated from each other. Moreover, different measuring line directions at a receiving terminal can be observed simultaneously, and each measuring point has two polarization directions, thus greatly improving the exploration efficiency and the data volume.

8 Claims, 3 Drawing Sheets

(56) References Cited

FOREIGN PATENT DOCUMENTS

| | | |
|---|---|---|
| CN | 115097531 A | 9/2022 |
| CN | 115794028 A | 3/2023 |

OTHER PUBLICATIONS

Yang Yang et al. "Distributed Wide Field Electromagnetic Method Based on High-Order 2N Sequence Pseudo Random Signal". Transactions of Nonferrous Metals Society of China, 2022, vol. 3, pp. 1609-1622.

Dariu Doicin et al. "Quadripole-Quadripole Arrays for Direct Current Resistivity Measurements—Model Studies". Geophysics, Feb. 1976, vol. 41, No. 1, pp. 79-95.

\* cited by examiner

SYSTEM AND METHOD FOR CONTROLLED-SOURCE ELECTROMAGNETIC EXPLORATION BASED ON STAGGERED FREQUENCY EXCITATION OF CROSSED SOURCES

FIELD OF TECHNOLOGY

The present invention belongs to the field of geophysical exploration technologies, and relates to a system and method for controlled-source electromagnetic exploration based on staggered frequency excitation of crossed sources.

BACKGROUND

The statements in this section only provide background information related to the present invention and do not necessarily constitute the prior art.

In the actual exploration process, measuring lines are generally crisscrossed, with a huge difference in direction. A field source in single polarization direction cannot meet the actual requirements of urban observation, and only limited data in a specific polarization direction can be obtained. Multiple field sources need to be deployed to cover the entire observation area. In previous practical applications, multiple sources can be excited at the same or different positions, and signals can be transmitted at the same or different time. However, the transmission at different time in different positions may reduce the exploration efficiency, and there is often a significant difference in source effects when controlled-sources in different positions are excited, which greatly impacts subsequent processing and explanation. Therefore, it is a feasible way to use excitation of crossed field sources in the same position.

In practical applications, there is often a big difference between actually transmitted signals and designed time series under the influence of geophysical conditions of different sources. If two adjacent sources are used for transmission at a same frequency, it is difficult to accurately control the amplitude and phase of excitation time series of the two sources in a transmission system. Moreover, if high-order pseudo-random signals are used in field exploration to transmit all frequencies at once, a signal contains a large number of exploration frequencies, and there is a significant difference between different frequencies under the influence of ground inductive reactance and hardware, which further increases the difficulty in transmission at the same frequency and time, resulting in failure to implement simultaneous excitation of two sources in practical applications.

SUMMARY

To solve the above problems, the present invention proposes a system and method for controlled-source electromagnetic exploration based on staggered frequency excitation of crossed sources. According to the present invention, different high-order pseudo-random signals are transmitted using two sources, respectively, each set of high-order pseudo-random signals may contain sufficient frequencies within a complete frequency range, exploration frequencies of the two sets of signals are completely staggered, simultaneous transmission by the two sources is implemented, and different polarization modes do not affect each other and are separated from each other. Moreover, different measuring line directions at a receiving terminal can be observed simultaneously, and each measuring point has two polarization directions, thus greatly improving the exploration efficiency and the data volume.

According to some embodiments, the present invention adopts the following technical solutions:

A system for controlled-source electromagnetic exploration based on staggered frequency excitation of crossed field sources includes a signal transmitting terminal and a signal receiving terminal, where
  the signal transmitting terminal is provided with a set of crossed sources each configured to transmit a set of high-order pseudo-random signals, and the two sets of signals have effective exploration frequencies (i.e., main frequencies in the high-order pseudo-random signals) not overlapping with each other and each is capable of covering a complete frequency range; and
  the signal receiving terminal is provided with two sets of mutually orthogonal electrodes configured to receive the two sets of high-order pseudo-random signals, distinguish polarization modes based on frequency components of the signals, and extract corresponding polarization mode data.

The above system solves the problems of a low efficiency of excitation at different time, a complex same frequency induced polarization mode and the like by using the staggered frequency excitation of crossed sources, and may implement the exploration with only once transmission.

As an optional embodiment, the high-order pseudo-random signals are as follows:

$$S_n = \text{sign}(f_1 + f_2 + f_3 + \ldots + f_n) = \text{sign}\left(\sum_{i=1}^{n} f_i\right)$$

where $f_i$ is a basic construction unit for a series of stairstep signals, which is a periodic square wave signal referring to that a highest frequency and a lowest frequency in $f_i$ are selected as needed during construction of logarithmically non-uniform signals, that is, a customized basic unit for constructing the high-order pseudo-random signals, sign function is a sign function, and $S_n$ is a set of high-order pseudo-random signals.

Further, a weight factor is added during construction of the high-order pseudo-random signals to increase a high-frequency current.

As an optional embodiment, the two sets of signals have different main frequencies, and all harmonic frequencies do not overlap.

As an optional embodiment, transmission time and observation time for the two sets of signals are both at least an integral multiple of a minimal common period.

As an optional embodiment, the exploration frequencies of the two sets of signals are both capable of being increased or decreased by an equal multiple.

As an optional embodiment, the crossed sources are arranged at a same position, perpendicular to each other, and coincide at a central point, and each simultaneously transmits a set of high-order pseudo-random signals capable of forming a staggered frequency signal pair.

As an optional embodiment, the two sets of orthogonal electrodes provided at the receiving terminal are perpendicular to each other and coincide at the central point, have a same distance from the central point, and receive the signals simultaneously.

As an optional embodiment, each set of the received signals at the receiving terminal contains the exploration frequencies of the two sets of high-order pseudo-random signals, and received data in two polarization directions is obtained for each set of high-order pseudo-random signals.

A method for controlled-source electromagnetic exploration based on staggered frequency excitation of crossed sources includes the following steps:

constructing a staggered frequency signal pair, where the staggered frequency signal pair includes two sets of high-order pseudo-random signals having effective exploration frequencies (i.e., main frequencies in the high-order pseudo-random signals) not overlapping with each other and each covering a complete frequency range;

at a signal transmitting terminal, providing a set of crossed sources each configured to transmit a set of high-order pseudo-random signals in the staggered frequency signal pair; and at a signal receiving terminal, providing two sets of mutually orthogonal electrodes configured to receive the two sets of high-order pseudo-random signals, distinguish polarization modes based on frequency components of the signals, and extract corresponding polarization mode data.

Compared with the prior art, the present invention has the following beneficial effects:

According to the present invention, the staggered frequency signal pair is constructed, the two sets of high-order pseudo-random signals having effective exploration frequencies (i.e., main frequencies in the high-order pseudo-random signals) not overlapping with each other are obtained, the correlation between frequency ranges of the two sets of signals is taken into account, simultaneous transmission and field reception by different sources are implemented, and data in different polarization directions is not mutually affected.

In view of the problem of difficulty in detecting all measuring lines using only one source due to crisscrossed measuring lines during controlled-source electromagnetic exploration, the present invention solves the problems of a low efficiency of excitation at different time, a complex same frequency induced polarization mode and the like by using the staggered frequency excitation of crossed field sources, and may implement the exploration with only once transmission, thus improving the working efficiency.

According to the present invention, the crossed sources transmit the two sets of signals, respectively, and each set of high-order pseudo-random signals may contain sufficient frequencies within a complete frequency range and obtains the received data in the two polarization directions, thus greatly increasing the received data volume.

BRIEF DESCRIPTION OF THE DRAWINGS

The drawings constituting a part of the present invention are used to provide a further understanding of the present invention. Schematic embodiments of the present invention and their descriptions are used to explain the present invention and do not constitute an improper limitation to the present invention.

DESCRIPTION OF THE EMBODIMENTS

The present invention is further described below with reference to the accompanying drawings and embodiments.

It should be pointed out that the following detailed descriptions are all illustrative and are intended to provide further descriptions of the present invention. Unless otherwise indicated, all technical and scientific terms used herein have the same meanings as commonly understood by those of ordinary skill in the art to which the present invention belongs.

It should be noted that the terms used herein are only for describing specific embodiments, and are not intended to limit exemplary embodiments according to the present invention. As used herein, unless the context explicitly indicates otherwise, a singular form is also intended to include a plural form. In addition, it should be understood that when the terms "contain" and/or "include/comprise" are used in this specification, it indicates that features, steps, operations, devices, components, and/or combinations thereof exist.

The embodiments in the present application and the features in the embodiments may be combined with each other under no conflict.

Embodiment 1

This embodiment discloses a method for controlled-source electromagnetic exploration based on staggered frequency excitation of crossed sources, including the following steps.

In step 1, staggered frequency signals are subjected to overall design based on a method for constructing high-order pseudo-random signals, to implement once construction and encoding of a staggered frequency signal pair.

Specifically, an equation for constructing the high-order pseudo-random signals in step 1 may be written as:

$$S_n = \text{sign}(f_1 + f_2 + f_3 + \ldots + f_n) = \text{sign}\left(\sum_{i=1}^{n} f_i\right) \qquad (1)$$

where $f_i$ is a basic construction unit (a periodic square wave signal) for a series of stairstep signals, which refers to that a highest frequency and a lowest frequency in $f_i$ are selected as needed during construction of logarithmically non-uniform signals, that is, a customized basic unit for constructing the high-order (logarithmically non-uniform) pseudo-random signals, sign function is a sign function, and $S_n$ is a set of high-order pseudo-random signals.

When it is assumed that one of the higher-order pseudo-random signals of the staggered frequency signal pair has a main frequency of 1 Hz and the other has a main frequency of 1.2 Hz, an overlapping relationship among all harmonic components of 1 Hz and 1.2 Hz needs to be considered during construction. It is obvious that 6 Hz, 12 Hz, 18 Hz, etc. are harmonics of both 1 Hz and 1.2 Hz. Therefore, 6 Hz, 12 Hz, 18 Hz, etc. cannot be used as effective frequencies and need to be avoided during encoding.

Figure 1:
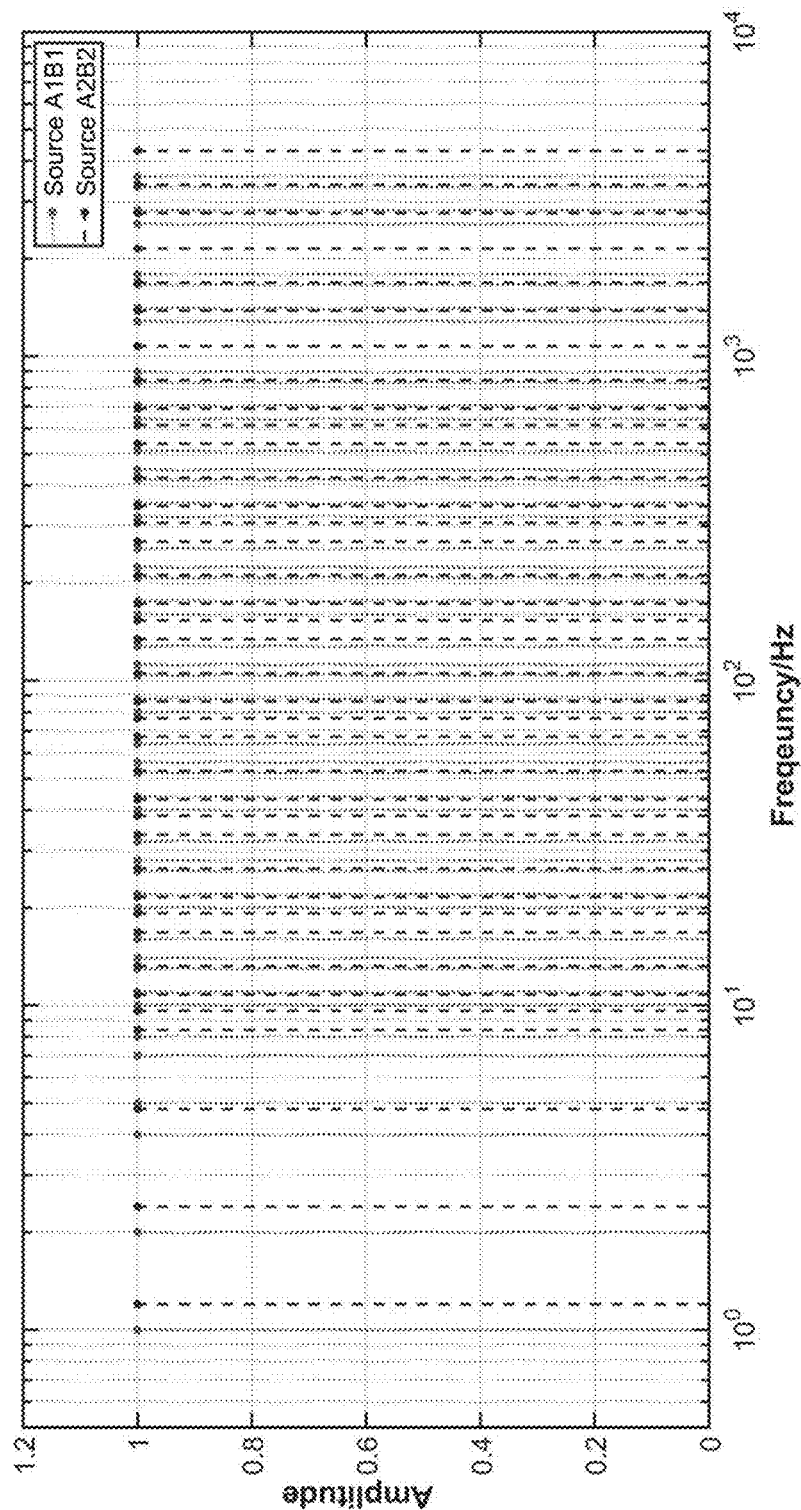
FIG. 1 is a distribution diagram of exploration frequencies of a staggered frequency signal pair based on ideal conditions of 1 Hz and 1.2 Hz.
Figure 2:
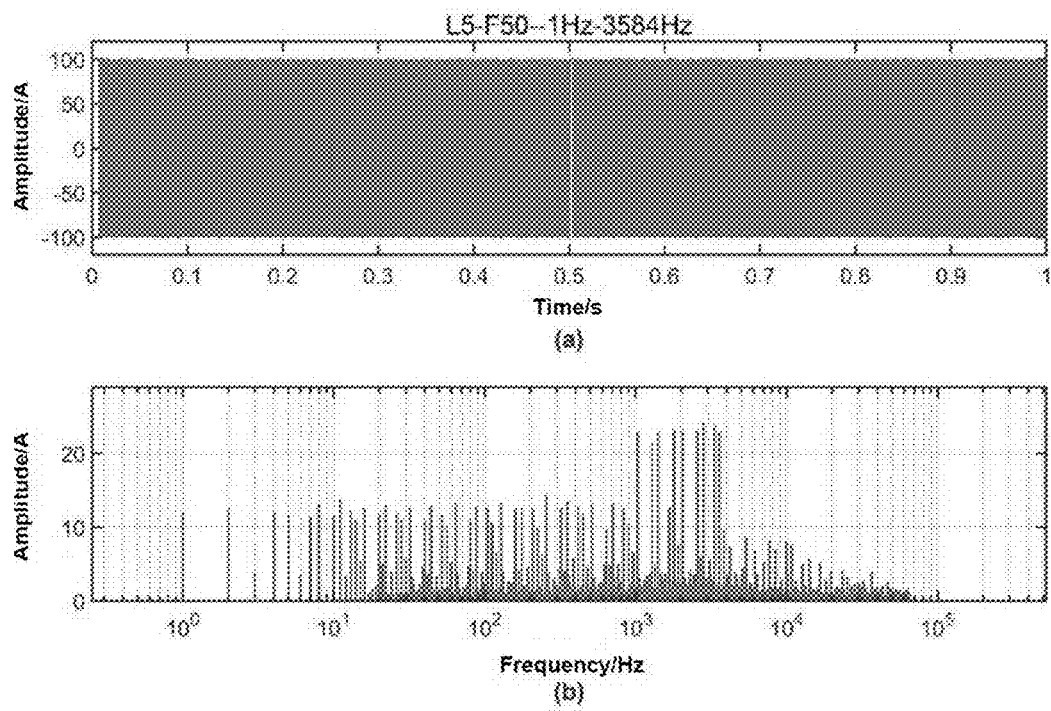
FIG. 2 is a schematic diagram of a customized pseudo-random signal with a main frequency of 1 Hz for an artificial source $A_1B_1$, in which (a) is a time sequence diagram and (b) is a spectrum diagram of the signal.
Figure 3:
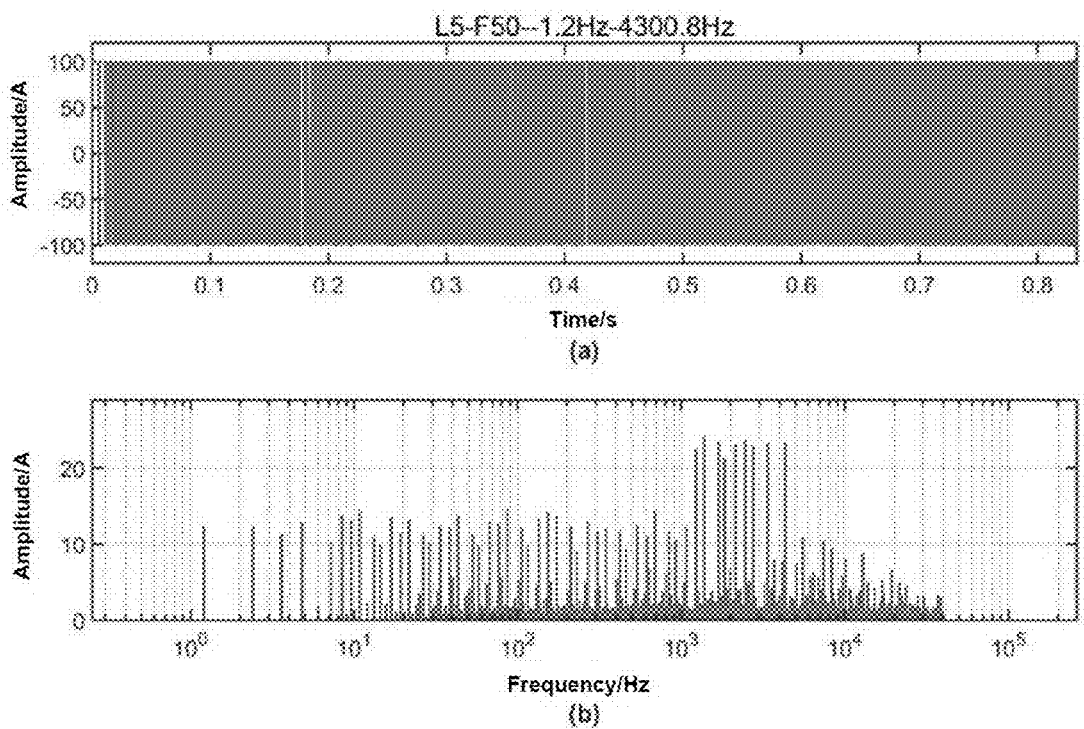
FIG. 3 is a schematic diagram of a customized pseudo-random signal with a main frequency of 1.2 Hz for an artificial source $A_2B_2$, in which (a) is a time sequence diagram and (b) is a spectrum diagram of the signal.

FIG. 1 is a distribution diagram of main frequencies in two sets of signals based on ideal conditions of 1 Hz and 1.2 Hz. FIG. 2 is a schematic diagram of a customized pseudo-random signal with a main frequency of 1 Hz for an artificial source $A_1B_1$, in which (a) is a time sequence diagram and (b) is a spectrum diagram of the signal. FIG. 3 is a schematic diagram of a customized pseudo-random signal with a main frequency of 1.2 Hz for an artificial source $A_2B_2$, in which (a) is a time sequence diagram and (b) is a spectrum diagram of the signal.

In some embodiments, a weight factor may also be used to perform targeted enhancement on the pseudo-random signals. Specifically, a high-frequency current of the two sets of signals may be enhanced with reference to the applied invention patent (application number: 2023101017920, and title of invention: method, system, medium, and device for constructing pseudo-random signal based on amplitude targeted enhancement). Results are as shown in (a) and (b) of FIG. 2 and (a) and (b) of FIG. 3.

In the (a) and (b) of FIG. 2, the signals are periodic square wave signals with amplitudes of +100 and −100.

1 Hz (with a period of 1 s) and 1.2 Hz (with a period of =5/6 s) are in accordance with staggered frequency characteristics. However, since the two are observed simultaneously, in order to ensure data authenticity and avoid spectral leakage, observation for an integral multiple of 5 s (minimal common period) is required to ensure that the two sets of signals have complete periods.

In step 2, a signal transmitting terminal is provided with a set of crossed sources which transmit two sets of high-order pseudo-random signals (the staggered frequency signal pair) having effective exploration frequencies (i.e., main frequencies in the high-order pseudo-random signals) not overlapping with each other, respectively.

Figure 4:
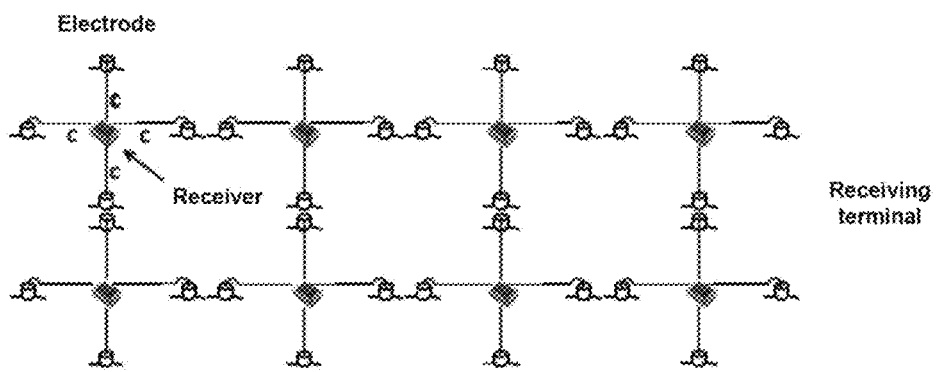
FIG. 4 is a layout diagram of a receiving terminal of a field observation device in a system for transmission based on staggered frequency excitation of crossed field sources.

Specifically, see FIG. 4 for a layout of a field observation device in a system for transmission based on staggered frequency excitation of crossed sources. The source $A_1B_1$ transmits the customized pseudo-random signal with the main frequency of 1 Hz as shown in (a) and (b) of FIG. 2, where a frequency range is 1-3,584 Hz. The source $A_2B_2$ transmits the customized pseudo-random signal with the main frequency of 1.2 Hz as shown in (a) and (b) of FIG. 3, where a frequency range is 1.2-4,300.8 Hz. The source $A_1B_1$ and the source $A_2B_2$ are perpendicular to each other and evenly divided, and both have a length of 2ab.

Specifically, the customized pseudo-random signal with the main frequency of 1 Hz is 5-order, and see Table 1 for frequency components thereof:

TABLE 1

Frequency components of customized pseudo-random signal with main frequency of 1 Hz

| Order | Frequency/Hz | Order | Frequency/Hz | Order | Frequency/Hz | Order | Frequency/Hz | Order | Frequency/Hz |
|---|---|---|---|---|---|---|---|---|---|
| 1 | 1 | 2 | 5 | 3 | 7 | 4 | 11 | 5 | 13 |
| 1 | 2 | 2 | 10 | 3 | 14 | 4 | 22 | 5 | 26 |
| 1 | 4 | 2 | 20 | 3 | 28 | 4 | 44 | 5 | 52 |
| 1 | 8 | 2 | 40 | 3 | 56 | 4 | 88 | 5 | 104 |
| 1 | 16 | 2 | 80 | 3 | 112 | 4 | 176 | 5 | 208 |
| 1 | 32 | 2 | 160 | 3 | 224 | 4 | 352 | 5 | 416 |
| 1 | 64 | 2 | 320 | 3 | 448 | 4 | 704 | 5 | 832 |
| 1 | 128 | 2 | 640 | 3 | 896 | 4 | 1408 | 5 | 1664 |
| 1 | 256 | 2 | 1280 | 3 | 1792 | 4 | 2816 | 5 | 3328 |
| 1 | 512 | 2 | 2560 | 3 | 3584 | | | | |
| 1 | 1024 | | | | | | | | |
| 1 | 2048 | | | | | | | | |

The customized pseudo-random signal with the main frequency of 1.2 Hz is 5-order, and see Table 2 for frequency components thereof:

TABLE 2

Frequency components of customized pseudo-random signal with main frequency of 1.2 Hz

| Order | Frequency/Hz | Order | Frequency/Hz | Order | Frequency/Hz | Order | Frequency/Hz | Order | Frequency/Hz |
|---|---|---|---|---|---|---|---|---|---|
| 1 | 1.2 | 2 | 3.6 | 3 | 8.4 | 4 | 10.8 | 5 | 13.2 |
| 1 | 2.4 | 2 | 7.2 | 3 | 16.8 | 4 | 24.6 | 5 | 26.4 |
| 1 | 4.8 | 2 | 14.4 | 3 | 33.6 | 4 | 43.2 | 5 | 52.8 |
| 1 | 9.6 | 2 | 28.8 | 3 | 67.2 | 4 | 86.4 | 5 | 105.6 |
| 1 | 19.2 | 2 | 57.6 | 3 | 134.4 | 4 | 172.8 | 5 | 211.2 |
| 1 | 38.4 | 2 | 115.2 | 3 | 268.8 | 4 | 345.6 | 5 | 422.4 |
| 1 | 76.8 | 2 | 230.4 | 3 | 537.6 | 4 | 691.2 | 5 | 844.8 |
| 1 | 153.6 | 2 | 460.8 | 3 | 1075.2 | 4 | 1382.4 | 5 | 1689.6 |

TABLE 2-continued

Frequency components of customized pseudo-random signal with main frequency of 1.2 Hz

| Order | Frequency/Hz | Order | Frequency/Hz | Order | Frequency/Hz | Order | Frequency/Hz | Order | Frequency/Hz |
|---|---|---|---|---|---|---|---|---|---|
| 1 | 307.2 | 2 | 921.6 | 3 | 2150.4 | 4 | 2764.8 | 5 | 3379.2 |
| 1 | 614.4 | 2 | 1843.2 | 3 | 4300.8 | | | | |
| 1 | 1228.8 | | | | | | | | |
| 1 | 2457.6 | | | | | | | | |

The exploration frequencies of the two sets of signals are both capable of being increased or decreased by an equal multiple. For example, 1 Hz, 2 Hz, 4 Hz, 8 Hz, etc. become 3 Hz, 6 Hz, 12 Hz, 24 Hz, etc. or 0.25 Hz, 0.5 Hz, 1 Hz, 2 Hz, etc. The details will not be repeated herein.

In step 3, a signal receiving terminal is provided with two sets of mutually orthogonal electrodes which receive the two sets of high-order pseudo-random signals, distinguish polarization modes based on frequency components, and extract corresponding polarization mode data.

Figure 5:
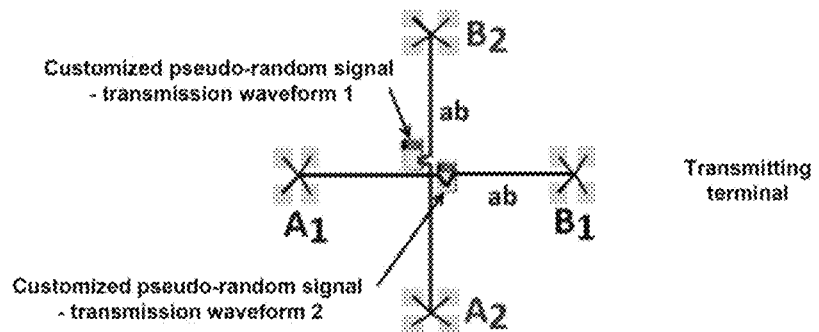
FIG. 5 is a layout diagram of a transmitting terminal of a field observation device in a system for transmission based on staggered frequency excitation of crossed field sources.

Specifically, see FIG. 4 and FIG. 5 for a layout of a field observation device in a system for transmission based on staggered frequency excitation of crossed sources. The receiving electrodes have a same length of 2c, and are perpendicular to each other and evenly divided. A receiver is arranged at a point of intersection, is connected to the electrodes through wires, and receive two sets of high-order pseudo-random signals in two polarization directions.

Embodiment 2

A system for controlled-source electromagnetic exploration based on staggered frequency excitation of crossed sources is provided, including a signal transmitting terminal and a signal receiving terminal, where the signal transmitting terminal is provided with a set of crossed sources each configured to transmit a set of high-order pseudo-random signals, and the two sets of signals have effective exploration frequencies (i.e., main frequencies in the high-order pseudo-random signals) not overlapping with each other and each contains at least a complete frequency range; and the signal receiving terminal is provided with two sets of mutually orthogonal electrodes configured to receive the two sets of high-order pseudo-random signals, distinguish polarization modes based on frequency components of the signals, and extract corresponding polarization mode data.

For parts not described, reference can be made to Embodiment 1.

While the specific embodiments of the present invention have been described above with reference to the accompanying drawings, they are not intended to limit the scope of protection of the present invention. It should understand by those skilled in the art that various modifications or transformations made by those skilled in the art based on the technical solutions of the present invention without creative efforts are still within the scope of protection of the present invention.

What is claimed is:

1. A system for controlled-source electromagnetic exploration based on staggered frequency excitation of crossed sources, comprising: a signal transmitting terminal and a signal receiving terminal, wherein:

the signal transmitting terminal comprises a set of crossed sources, wherein the set of the crossed sources comprises two controlled-sources arranged at a same position, the two controlled-sources are perpendicular to each other and coincide at a central point, each of the two controlled-sources is configured to transmit simultaneously a set of high-order pseudo-random signals being capable of forming a staggered frequency signal pair, two sets of the high-order pseudo-random signals have effective exploration frequencies not overlapping with each other, and each of the two sets of the high-order pseudo-random signals is capable of covering a complete frequency range; wherein, a transmission time and an observation time for the two sets of the high-order pseudo-random signals are both at least an integral multiple of a minimal common period; and, the signal receiving terminal comprises two sets of mutually orthogonal electrodes, wherein the two sets of mutually orthogonal electrodes are perpendicular to each other and coincide at the central point, each electrode of the two sets of mutually orthogonal electrodes has a same distance from the central point, and the two sets of mutually orthogonal electrodes are configured to simultaneously receive the two sets of the high-order pseudo-random signals; the signal receiving terminal is further configured to distinguish polarization modes based on components of the frequencies of the two sets of the high-order pseudo-random signals, and extract corresponding polarization mode data; wherein, each signal received by the signal receiving terminal contains the exploration frequencies of the two sets of the high-order pseudo-random signals, and received data in two polarization directions corresponding to each set of the high-order pseudo-random signals is obtained.

2. The system for controlled-source electromagnetic exploration based on staggered frequency excitation of crossed sources according to claim 1, wherein the two sets of signals have different main frequencies, and all harmonic frequencies do not overlap.

3. The system for controlled-source electromagnetic exploration based on staggered frequency excitation of crossed sources according to claim 1, wherein the exploration frequencies of the two sets of signals are both capable of being increased or decreased by an equal multiple.

4. The system for controlled-source electromagnetic exploration based on staggered frequency excitation of crossed sources according to claim 1, wherein the high-order pseudo-random signals are as follows:

$$S_n = \text{sign}(f_1 + f_2 + f_3 + \ldots + f_n) = \text{sign}\left(\sum_{i=1}^{n} f_i\right)$$

wherein $f_i$ is a basic construction unit for a series of stairstep signals, which is a periodic square wave signal referring to that a highest frequency and a lowest frequency in $f_i$ are selected as needed during construction of logarithmically non-uniform signals, that is, a customized basic unit for constructing the high-order pseudo-random signals, the function sign is a sign function, and $S_n$ is a set of high-order pseudo-random signals.

5. The system for controlled-source electromagnetic exploration based on staggered frequency excitation of crossed sources according to claim 4, wherein a weight factor is added during construction of the high-order pseudo-random signals to increase a high-frequency current.

6. The system for controlled-source electromagnetic exploration based on staggered frequency excitation of crossed sources according to claim 4, wherein the two sets of signals have different main frequencies, and all harmonic frequencies do not overlap.

7. The system for controlled-source electromagnetic exploration based on staggered frequency excitation of crossed sources according to claim 4, wherein the exploration frequencies of the two sets of signals are both capable of being increased or decreased by an equal multiple.

8. A method for controlled-source electromagnetic exploration based on staggered frequency excitation of crossed sources, comprising the following steps:
constructing a staggered frequency signal pair, wherein the staggered frequency signal pair comprises two sets of high-order pseudo-random signals having effective exploration frequencies not overlapping with each other and each of the two sets of the high-order pseudo-random signals is capable of covering at least a complete frequency range, and the exploration frequencies of the staggered frequency signal pair are capable of being increased or decreased by an equal multiple;
at a signal transmitting terminal, providing a set of crossed sources each configured to transmit simultaneously a set of high-order pseudo-random signals in the staggered frequency signal pair; wherein the set of the crossed sources comprises two controlled-sources arranged at a same position, the two controlled-sources are perpendicular to each other and coincide at a central point, and
at a signal receiving terminal, providing two sets of mutually orthogonal electrodes, configured to simultaneously receive the two sets of the high-order pseudo-random signals, distinguish polarization modes based on components of the frequencies of the two sets of the high-order pseudo-random signals, and extract corresponding polarization mode data, wherein the two sets of mutually orthogonal electrodes are perpendicular to each other and coincide at the central point, and each electrode of the two sets of mutually orthogonal electrodes has a same distance from the central point;
a transmission time and an observation time for the two sets of the high-order pseudo-random signals are both at least an integral multiple of a minimal common period;
each signal received by the receiving terminal contains the exploration frequencies of the two sets of the high-order pseudo-random signals, and received data in two polarization directions corresponding to each set of the high-order pseudo-random signals is obtained.

\* \* \* \* \*